(12) United States Patent
Yang et al.

(10) Patent No.: US 9,473,264 B2
(45) Date of Patent: *Oct. 18, 2016

(54) APPARATUS AND METHOD FOR TRANSMITTING/RECEIVING PACKET IN COMMUNICATION SYSTEM

(71) Applicant: Samsung Electronics Co. Ltd., Suwon-si, Gyeonggi-do (KR)

(72) Inventors: Hyunkoo Yang, Seoul (KR); Sunghee Hwang, Suwon-si (KR); Seho Myung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/867,431

(22) Filed: Apr. 22, 2013

(65) Prior Publication Data

US 2013/0283132 A1 Oct. 24, 2013

(30) Foreign Application Priority Data

Apr. 23, 2012 (KR) .................. 10-2012-0042204
Apr. 30, 2012 (KR) .................. 10-2012-0045733

(51) Int. Cl.
*H03M 13/00* (2006.01)
*H04L 1/00* (2006.01)

(52) U.S. Cl.
CPC ............. *H04L 1/004* (2013.01); *H04L 1/0057* (2013.01)

(58) Field of Classification Search
None
See application file for complete search history.

(56) References Cited

U.S. PATENT DOCUMENTS

| | | | |
|---|---|---|---|
| 6,278,716 B1 | 8/2001 | Rubenstein et al. | |
| 7,447,978 B2 * | 11/2008 | Hannuksela | 714/776 |
| 7,660,245 B1 * | 2/2010 | Luby | 370/230 |
| 7,676,735 B2 * | 3/2010 | Luby et al. | 714/781 |
| 7,971,129 B2 * | 6/2011 | Watson et al. | 714/784 |
| 8,473,821 B2 * | 6/2013 | Taghavi Nasrabadi et al. | 714/776 |
| 2005/0166123 A1 * | 7/2005 | Yanamoto et al. | 714/776 |
| 2008/0151776 A1 * | 6/2008 | Kure | 370/253 |
| 2009/0067551 A1 | 3/2009 | Chen et al. | |
| 2009/0168708 A1 | 7/2009 | Kumar et al. | |
| 2009/0193318 A1 * | 7/2009 | Schoenblum | 714/776 |
| 2009/0307564 A1 * | 12/2009 | Vedantham et al. | 714/776 |
| 2010/0050057 A1 * | 2/2010 | Luby | 714/776 |
| 2011/0219279 A1 * | 9/2011 | Abu-Surra et al. | 714/746 |

(Continued)

FOREIGN PATENT DOCUMENTS

WO 2009-137705 A2 11/2009
WO 2011-108904 A2 9/2011

OTHER PUBLICATIONS

M. Watson, Forward Error Correction (FEC) Framework, Internet Engineering Task Force (IETF), RFC 6363, ISSN: 2070-1721, Oct. 2011.

*Primary Examiner* — Daniel McMahon
(74) *Attorney, Agent, or Firm* — Jefferson IP Law, LLP

(57) ABSTRACT

A packet transmission/reception method for use in a communication system is provided. The method includes generating control information corresponding to Forward Error Correction (FEC), acquiring at least one source packet to be protected using the FEC, generating at least one repair symbol with at least one repair FEC payload ID and at least one source FEC payload ID according to the at least one source packet and the control information, and transmitting the at least one source packet, the at least one repair symbol with the at least one repair FEC payload ID, and the at least one source FEC payload ID.

3 Claims, 15 Drawing Sheets

(56) References Cited

U.S. PATENT DOCUMENTS

2013/0013982 A1* 1/2013 Hwang et al. ............... 714/776
2013/0094502 A1* 4/2013 Hwang ............ H03M 13/2707
                                                            370/389
2013/0227376 A1* 8/2013 Hwang et al. ............... 714/776

* cited by examiner

$$= \begin{bmatrix} & P & I & O & \cdots & O & O \\ & O & I & I & \cdots & O & O \\ & \vdots & O & I & \cdots & O & O \\ H_I & I & \vdots & \vdots & \cdots & \vdots & \vdots \\ & \vdots & \vdots & \vdots & \cdots & I & O \\ & O & O & O & \cdots & I & I \\ & P & O & O & \cdots & O & I \end{bmatrix},\ P = \begin{bmatrix} 0 & 1 & 0 & & 0 \\ 0 & 0 & 1 & \cdots & 0 \\ \vdots & \vdots & \vdots & & \vdots \\ 0 & 0 & 0 & \cdots & 1 \\ 1 & 0 & 0 & & 0 \end{bmatrix}_{L \times L}$$

APPARATUS AND METHOD FOR TRANSMITTING/RECEIVING PACKET IN COMMUNICATION SYSTEM

PRIORITY

This application claims the benefit under 35 U.S.C. §119 (a) of a Korean patent application filed on Apr. 23, 2012 in the Korean Intellectual Property Office and assigned Serial No. 10-2012-0042204, and a Korean patent application filed on Apr. 30, 2012 in the Korean Intellectual Property Office and assigned Serial No. 10-2012-0045733, the entire disclosures of which are hereby incorporated by reference.

BACKGROUND OF THE INVENTION

1. Field of the Invention

The present invention relates to a communication system. More particularly, the present invention relates to a packet transmission/reception method for use in a communication system.

2. Description of the Related Art

With the diversification of contents and an increase in size of contents, such as High Definition (HD) and Ultra High Definition (UHD) contents, accessed using a communication system, such as a computer network, network data congestion is increasing and quality of communication systems may decrease. In this situation, the content transmitted by a sender, e.g. Host A, may be lost along a transmission route before being received by a receiver, e.g. Host B. Since the data are carried in packets in the computer network, data loss also occurs in units of packets. Each packet consists of a payload carrying data and a header containing address information, such as a source address and a destination address. Accordingly, when packet loss occurs in the computer network, the receiver may not receive the missing packet and thus fails to acquire data and control information contained in the missing packet. This causes a user's inconvenience in various forms, such as audio and video quality degradation, subtitle miss-out, file loss, and other similar problems and inconveniences resulting from missing packets. Therefore, there is a need for a method for recovering data loss in the computer network.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for recovering data loss in the network.

Accordingly, another aspect of the present invention is to provide an Application Layer-Forward Error Correction (AL-FEC) control method that is improves network reliability by transmitting a parity packet generated using at least one error correction code along with a data packet in the communication network supporting packet-based communication protocol.

In accordance with an aspect of the present invention, a packet transmission method in a communication system is provided. The method includes generating control information corresponding to Forward Error Correction (FEC), acquiring at least one source packet to be protected, generating at least one repair symbol with at least one repair FEC payload ID and at least one source FEC payload IDs according to the at least one source packet and the control information, and transmitting the at least one source packet, the at least one repair symbol with the at least one repair FEC payload ID, and the at least one source FEC payload ID.

In accordance with another aspect of the present invention, a packet transmission apparatus in a communication system is provided. The apparatus includes a control unit for generating control information corresponding to FEC, for acquiring at least one source packets to be protected using the FEC, for generating at least one repair symbol with at least one repair FEC payload ID and at least one source FEC payload ID according to the at least one source packet and the control information, and a communication unit for transmitting the at least one source packet, the at least one repair symbol with the at least one repair FEC payload ID, and the at least one source FEC payload ID.

In accordance with another aspect of the present invention, a packet reception method in a communication system is provided. The method includes receiving at least one FEC packet, acquiring at least one source packet, at least one repair symbol with at least one repair FEC payload ID and at least one source FEC payload ID from the at least one or more FEC packet, and recovering a lost part of the at least one source packet using the at least one repair symbol, the at least one repair FEC payload ID, and the at least one source FEC payload ID.

In accordance with another aspect of the present invention, a packet reception apparatus in a communication system is provided. The apparatus includes a communication unit for receiving at least one FEC packet, and a control unit for acquiring at least one source packet, at least one repair symbol with at least one repair FEC payload ID, and at least one source FEC payload ID from the at least one FEC packet, and for recovering a lost part of the at least one source packet using the at least one repair symbol, the at least one repair FEC payload ID, and the at least one source FEC payload ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 15 is a diagram illustrating a structure of a matrix H for use in a method according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
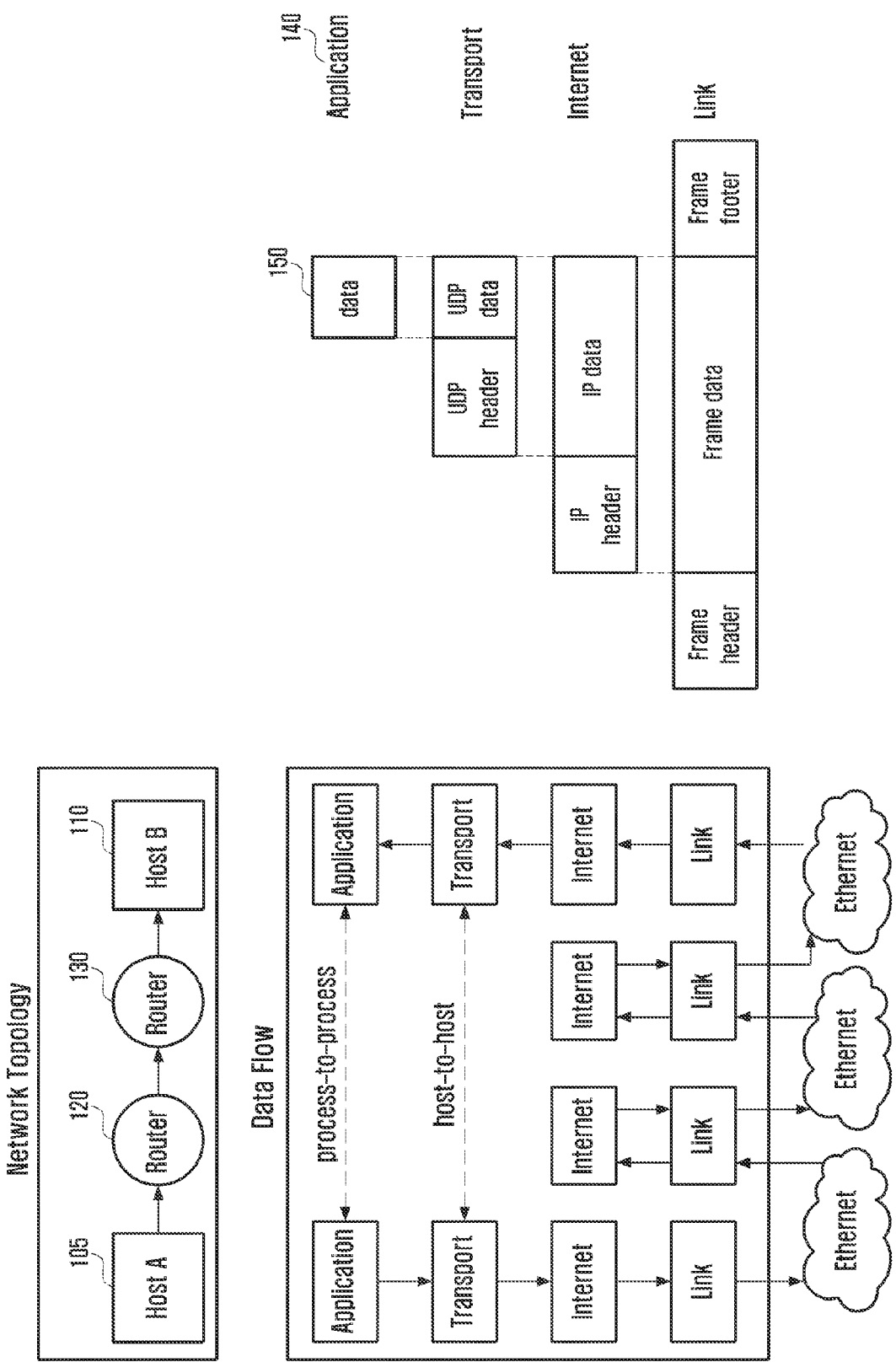
FIG. 1 is a diagram illustrating a network topology and data flows according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the following description are summarized herein: a Forward Error Correction (FEC) code may be an error correction code for correcting error or erasure symbol; a FEC frame may be a codeword generated by FEC encoding data to be protected and including a parity or repair part; a symbol may be a unit of data, and a size of the symbol, in bits, may be referred to as a symbol size; a source symbol may be an unprotected data symbol, which is the information part of a FEC Frame; an information symbol may be unprotected data or a padding symbol, which is an information part of a FEC frame; a codeword may be a FEC frame generated by FEC-decoding an information symbol; a repair symbol may be a repair symbol of a FEC frame generated by FEC encoding from an information symbol; a packet may be a transmission unit including a header and a payload; a payload may be a piece of user data which is to be transmitted from a transmitter and which is placed inside of a packet; a packet header may be a header of a packet including a payload; a source payload may be a payload consisting of source symbols; an information payload may be a payload consisting of information symbols; a repair payload may be a payload consisting of repair symbols; a source symbol block may be a set of at least one source payload; an information block may be a set of at least one information payload; a repair symbol block may be a set of at least one repair payload; an FEC block may be a set of codewords or payloads including information blocks and repair symbol blocks; an FEC delivery block may be a set of payloads including source symbol blocks and repair symbol blocks; an FEC packet may be a packet for transmitting an FEC block; an FEC source packet may be a packet for transmitting a source symbol block; an FEC repair packet may be a packet for transmitting a repair block; an FEC packet block may be a set of packets for transmitting FEC transmission blocks; a Motion Picture Expert Group (MPEG) Media Transport (MMT) may be an international standard under development for efficient transmission of MPEG data; an FEC source flow may be a sequence of FEC source packets or source payloads having a same FEC source flow Identifier (ID); an FEC repair flow may be a sequence of FEC source packets or source payloads having a same FEC repair flow ID; an FEC encoded flow may be a term referring integrally to the FEC source flow and at least one FEC repair flow generated for protecting the FEC source flow; an asset may be a data entity consisting of one or more M units, wherein an M unit is a data unit for defining composition information and transport characteristics; and a package may be a set of one or more assets depending on the supplementary information, such as composition information and transport characteristics.

FIG. 1 is a diagram illustrating a network topology and data flows according to an exemplary embodiment of the present invention.

Referring to FIG. 1, Internet Protocol (IP) packets are delivered to a destination receiver, Host B 110, via routers 120 and 130. Accordingly, the IP packets may arrive at the receiver, Host B, 110 in an order different from a transmission order of a sender, Host A, 105. Thus, there is a need of indicating the transmission order in Audio-Visual (AV) content streaming. Data 150, which is generated at an application layer 140, is assumed to be Real-time Transport Protocol (RTP) data acquired through compression by an AV codec and then marketization by RTP or the data packetized by the transport protocol of the application layer 140, such as an MMT transport packet to be described hereinafter with reference to FIG. 2.

Figure 2:
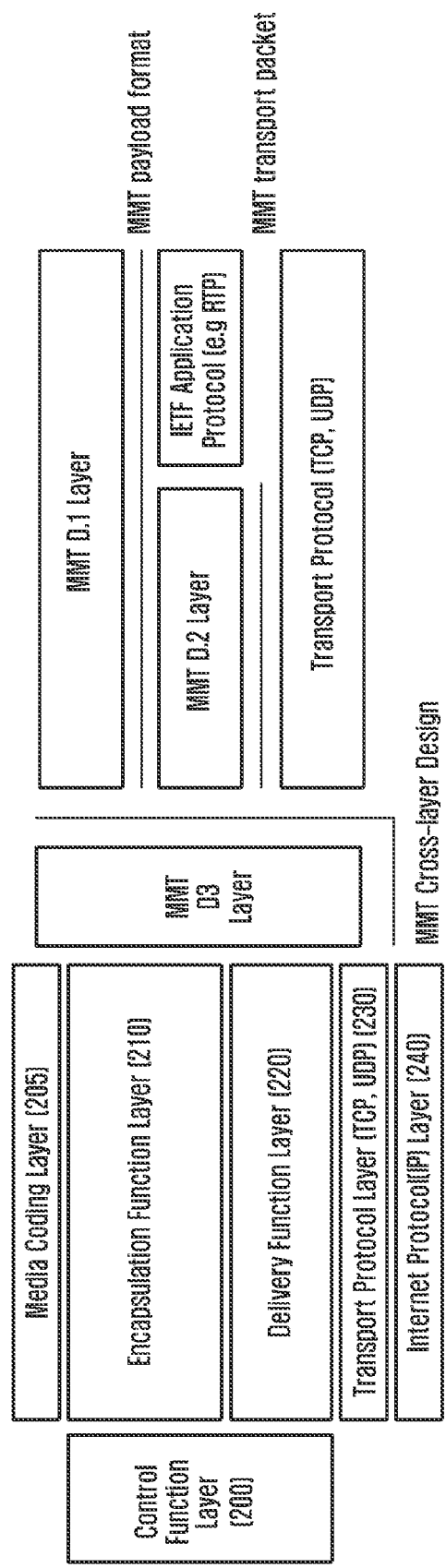
FIG. 2 is a block diagram illustrating a configuration of a Motion Picture Expert Group (MPEG) Media Transport (MMT) system according to an exemplary embodiment of the present invention.

FIG. 2 is a block diagram illustrating a configuration of an MMT system according to an exemplary embodiment of the present invention.

Referring to FIG. 2, the MMT system configuration is shown on a left side of FIG. 2, and the right side of FIG. 2 shows a detailed configuration of a deliver function of the MMT system. A media coding layer 205 compresses audio and/or video data and sends the compressed data to an encapsulation function layer 210. The encapsulation function layer 210 packages the compressed audio/video data in a format similar to a file formation and sends the packaged data to a delivery function layer 220.

The delivery function layer 220 performs MMT payload formatting on an output of the encapsulation function layer 210 and adds a transport packet header to generate an MMT transport packet format for a transport protocol layer 230. The delivery function layer 220 processes the output of the encapsulation function layer 210 with a legacy RTP protocol in order to generate an RTP packet format for the transport protocol layer 230. Afterwards, the transport protocol layer 230 performs conversion with one of a User Datagram Protocol (UDP) and a Transmission Control Protocol (TCP) in order to generate a UDP or a TCP data unit for an IP layer 240. Finally, the IP layer 240 processes the output of the transport protocol layer 230 in order to generate an IP packet, the IP packet being transmitted using IP. The FEC packet proposed in the present exemplary embodiments may be formatted according to at least one of an MMT payload format, an MMT transport packet, and an RTP packet. A control function layer 200 manages a presentation session and a delivery session.

Figure 3:
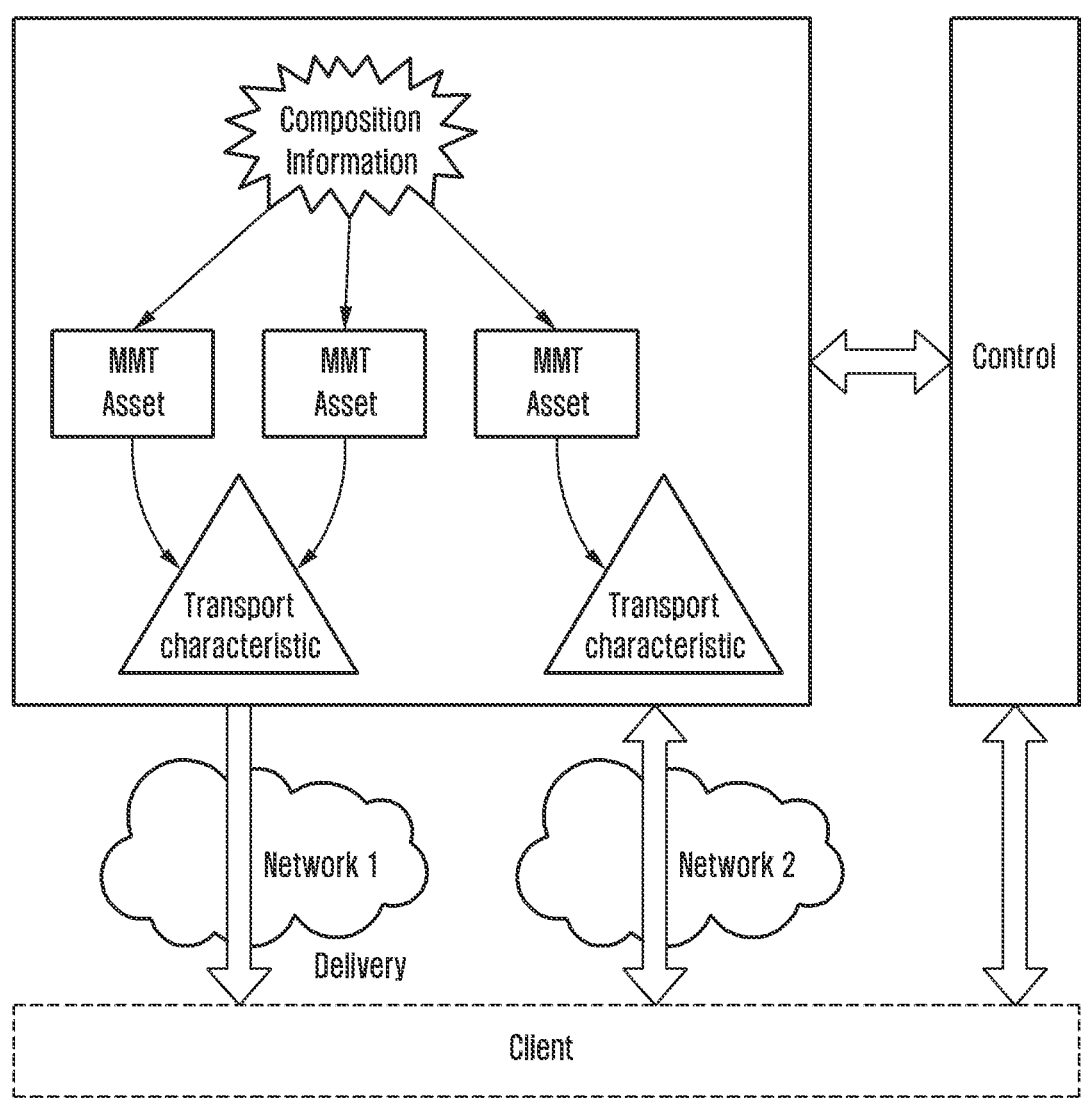
FIG. 3 is a diagram illustrating a structure of a package for use in a method according to an exemplary embodiment of the present invention.

FIG. 3 is a diagram illustrating a structure of a package for use in a method according to an exemplary embodiment of the present invention.

Figure 4:
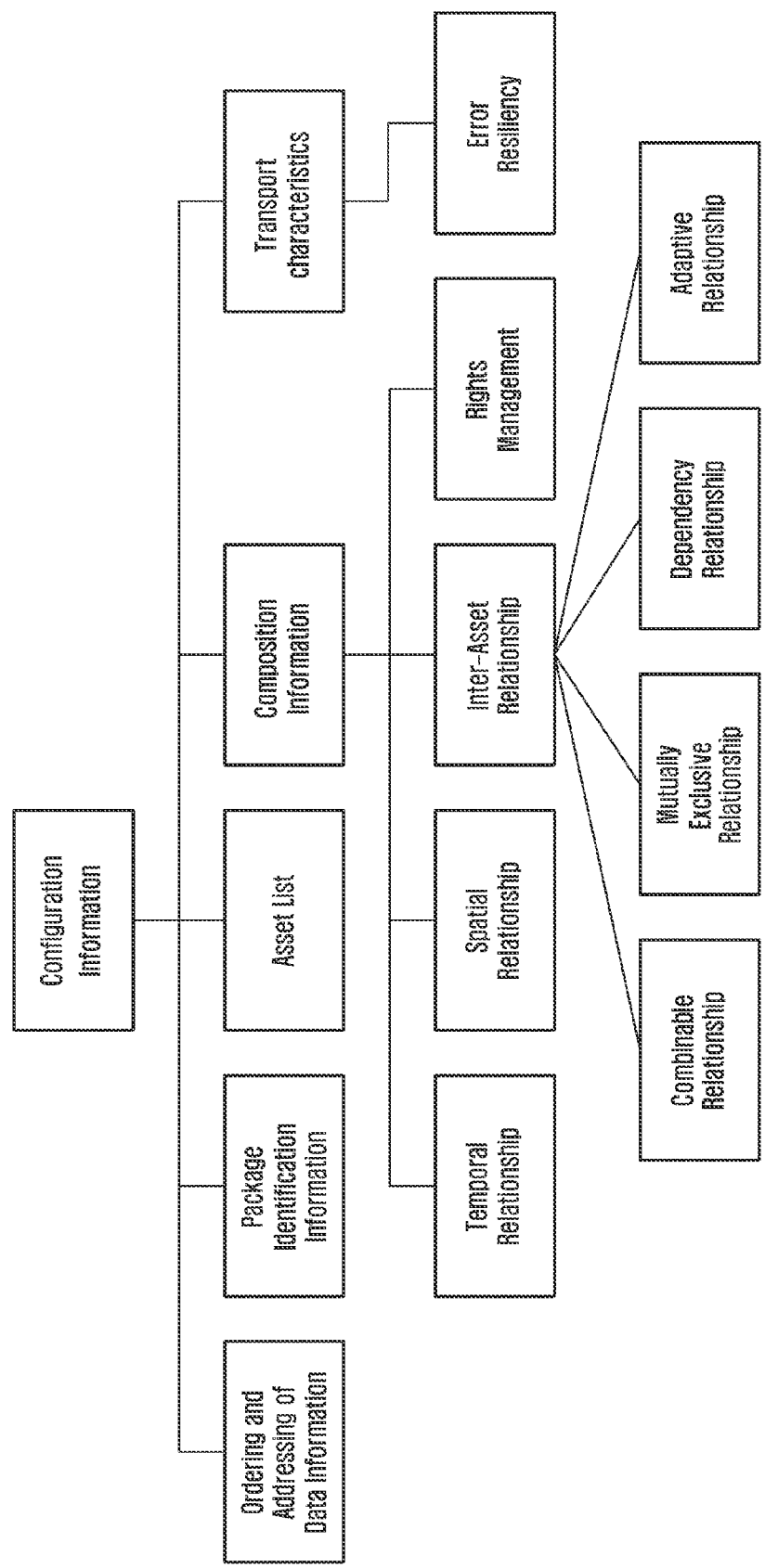
FIG. 4 is a diagram illustrating a structure of configuration information of the package of FIG. 3 according to an exemplary embodiment of the present invention.

FIG. 4 is a diagram illustrating a structure of configuration information of a package of FIG. 3 according to an exemplary embodiment of the present invention.

Referring to FIGS. 3 and 4, a package 300 is transmitted to a client through a delivery function layer of a network, such as network 1 and/or network 2, and the package includes MMT assets, composition information, and transport characteristics. The MMT transport packet also uses the configuration information and operations, as shown in FIG. 4. The configuration information includes an asset list, composition information, and transport characteristics and further includes ordering and addressing of data information and package identification information. Description information describes a package and assets. The composition information is used for consumption of assets. The transport characteristic information provides information for transporting the assets. The package describes the transport characteristics per asset. The transport characteristics include error resiliency information, and simple transport characteristic information for one asset may be lost or not. The transport characteristics also may include a Quality of Service (QoS) (not shown), a loss tolerance level (not shown), and a delay tolerance level (not shown) of each asset.

Figure 5:
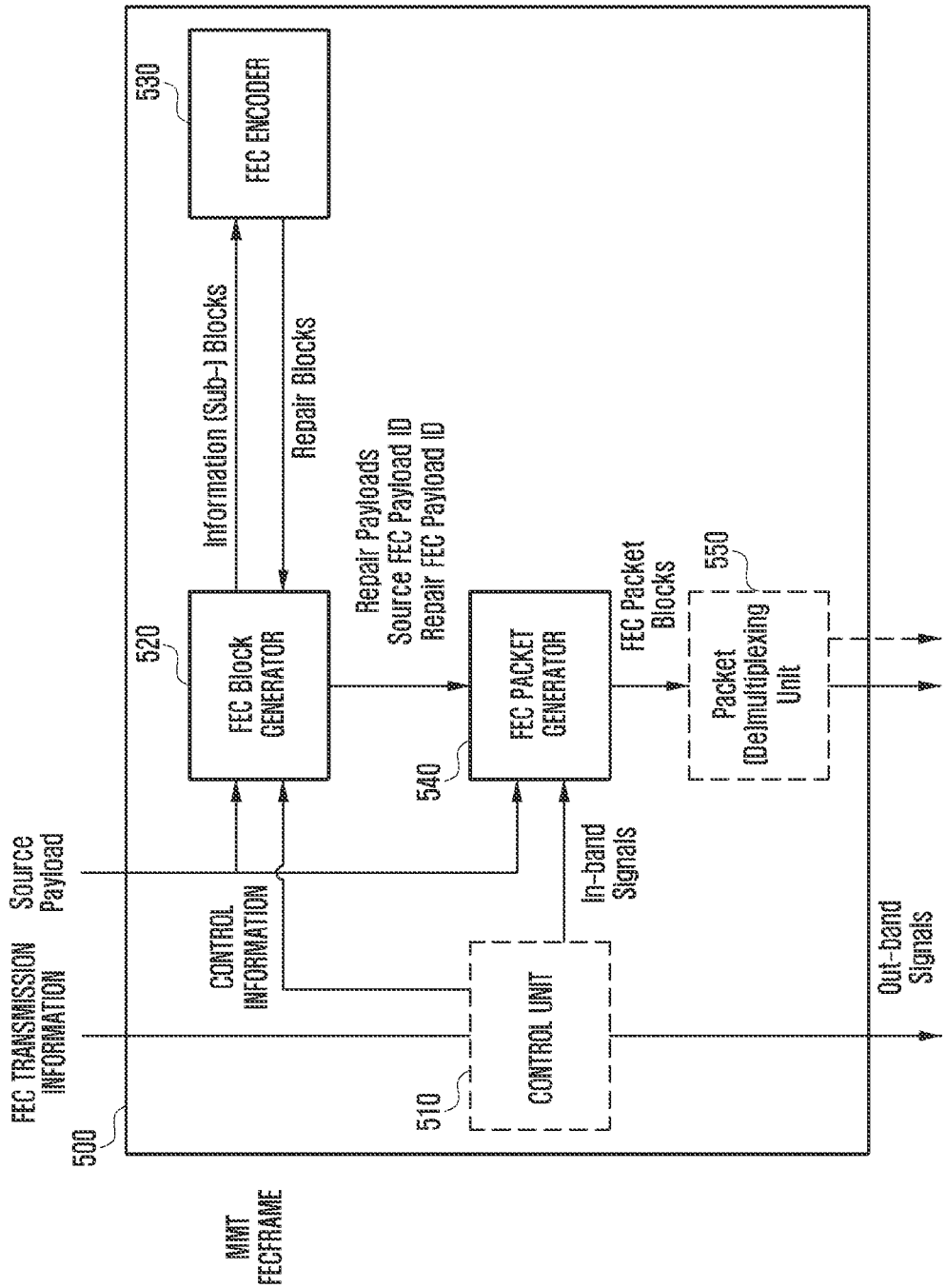
FIG. 5 is a block diagram illustrating a configuration of an MMT Forward Error Correction (FEC) frame (FEC-FRAME) according to an exemplary embodiment of the present invention.

FIG. 5 is a block diagram illustrating a configuration of an MMT FEC frame (FECFRAME) according to an exemplary embodiment of the present invention.

Referring to FIG. 5, an MMT FECFRAME 500 is a logical/physical component for generating an FEC stream. Accordingly, in a case of operating two or more FEC streams, a logical FECFRAME is established per FEC stream, and a physical FECFRAME operates in a time divisional manner. The MMT FECFRAME receives FEC transmission information and a source payload as inputs and generates an out-band signal and FEC packet block. Although the FEC transmission information is depicted as being input to a control unit 510 and an FEC block generator 520 in FIG. 5, the present invention is not limited thereto, and other function blocks may check the FEC transmission information for use in their operations from a system view point. As an Application Layer FEC (ALFEC) candidate technology of the MMT standard, a two-stage method has been proposed. According to the two-stage method, the MMT FECFRAME 500 divides a predetermined number of symbols into M first source symbols, wherein M is an integer that is greater than or equal to 1, and generates first encoding symbols including first repair symbols generated by performing the first FEC encoding on the first source symbols. Afterwards, the MMT FECFRAME 500 generates second encoding symbols including the second repair symbols generated by performing second FEC encoding on the M first encoding symbols as the second source symbols. The first FEC encoding and the second FEC encoding may use a same error correction code or different error correction codes. The error correction code may be any of a Reed-Solomon (RS) code, a Low Density Parity Check (LDPC code), a Turbo code, a Raptor Code, and an eXclusive OR (XOR), without restriction thereto. FIG. 5 also illustrates an FEC encoder 530, an FEC packet generator 540 and a packet (de)multiplexing unit 550.

Figure 6:
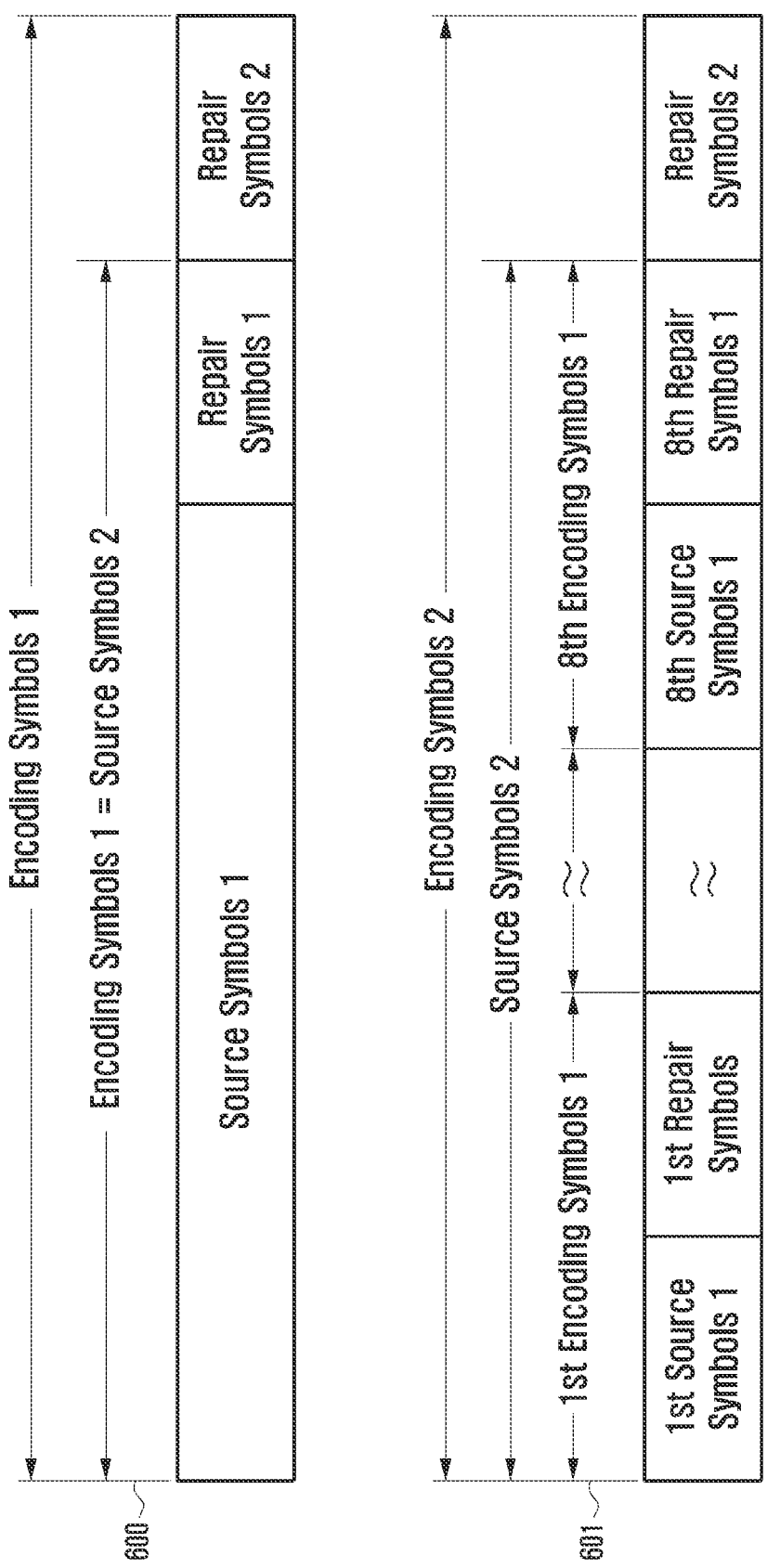
FIG. 6 is a diagram illustrating formats of encoding symbols of two-stage FEC encoding for use in a method according to an exemplary embodiment of the present invention.

FIG. 6 is a diagram illustrating formats of encoding symbols of two-stage FEC encoding for use in a method according to an exemplary embodiment of the present invention.

Referring to FIG. 6, a case of FEC encodings of M=1 and M=8 are shown. Particularly, part 600 shows an encoding symbol format for M=1 and part 601 shows an encoding symbol formation for M=8. Referring to FIGS. 5 and 6, the control unit 510 uses the FEC transmission information as input to generate control information, an in-band signal, and an out-band signal. The in-band signal is the control information transmitted as a part of the FEC packet, and the out-band signal is the control information transmitted through a separate packet, a separate protocol, or a separate channel. Since the out-band signal transmission is out of the scope of the present exemplary embodiments, detailed description thereof is omitted herein. The FEC transmission information is processed by a controller in separation from the MMT FECFRAME 500 without passing through the control unit 510 and is supplied as the input to the FEC block generator 520 and the FEC packet generator 540 and, in this case, the control unit 510 may be omitted. The control information includes the information requested by the FEC encoder 530 for generating the FEC block. A specific FEC code needs an initial value of a random number generator in a parity generation procedure. At this time, a sequence number, which the higher layer has assigned to the source payload, is may be used as an initial value of the random number generator. By taking notice of a data flow, it is inefficient to extract a needed value by analyzing a higher layer payload structure in the MMT FECFRAME 500, and thus an identity number is input to the MMT FECFRAME 500 in the form of control information and is used only as the control signal of the FEC code and is not output as the in-band signal or the out-band signal.

The FEC transmission information may include the transport characteristics of the MME asset and may vary according to the application including the MME FECFRAME 500 and protocol. For example, by taking notice of the two-stage method, the FEC transmission information is as follows.

1) Information on Coding Structure:
   fec_scheme: indicates a coding scheme selected for generating an FEC block;
   b000: No coding structure;
   b001: RS coding structure;
   b010: LDPC coding structure;
   b011: RS-RS two stage coding scheme;
   b100: RS-LDPC two stage coding scheme;
   b101: LDPC-LDPC two stage coding scheme;
   ibg_mode: indicates a method used for generating an information block from a source/sub block;
   b00: Normal Mode without padding data;
   b01: Normal Mode with padding data;
   b10: High Efficiency Mode;
   b11: Conditional padding Mode;
   parity_payload size: indicate length of repair payload; and
   number_of_payloads_in_a_parity_packet: indicates a number of repair payloads included in parity packet.

2) Information on Protection Interval:
   number_of_packets_for_source_block: indicates a number of packets included in a source symbol block;
   number_of_sub_blocks_in_source_block: indicates a number of sub-blocks included in a source symbol block;
   number_of_packets_for_sub_block: indicates a number of packets included in a sub-block;
   max_information_block_length: indicates a maximum number of information payloads included in an information block;
   information_block_length: indicates a number of payloads included in an information block; and
   information_sub_block_length: indicates a number of information payloads included an information code sub-block.

3) Information on Protection Interval:
   number_of_packets_for_parity1_block: indicates a number of parity packets included in a parity 1 block; and
   number_of_packets_for_parity2_block: indicates a number of parity packets included in a parity 2 block.

4) Information on Packet Identification:
   sequence_number: identity number assigned to each packet, wherein, when plural packets are transmitted sequentially, the sequence_number increases by 1;
   payload_type: indicates a type of FEC packet payload;
   b00: source payload;
   b01: parity 1 payload;
   b10: parity 2 payload;
   b11: reserved;
   fec_block_boundary_info: indicates an identity number assigned to a first packet of an FEC 1 block;
   fec1_block_boundary_info: indicates an identity number assigned to a first packet of an FEC 1 block;
   fec2_block_boundary_info: indicates an identity number assigned to a first packet of an FEC 2 block; and
   parity_data_for_ibg: indicates parity protecting information used for generating an information block.

In the two-stage procedure, the FEC transmission information is structured as an in-band signal and an out-band signal as follows for every FEC block or when the out-band signal can be transmitted before the source or parity packet transmission.

```
1) Out-band signal
    fec_scheme
    if (fec_scheme != 000) {
        ibg_mode
        parity_payload_size
        number_of_payloads_in_a_parity_packet
        if (fec_scheme = 001) or (fec_scheme = 010) {
            number_of_packets_for_source_block
            number_of_packets_for_parity_block
        }
        if (fec_scheme = 011) or (fec_scheme = 100)
        or (fec_scheme = 101) {
            number_of_sub_blocks_in_source_block
            number_of_packets_for_source_block
            information_block_length
            number_of_packets_for_parity1_block
            for
(i=0;i<number_of_sub_blocks_in_source_block;++i) {
                    number_of_packets_for_sub_block
                    information_sub_block_length
            number_of_packets_for_parity1_block2
            }
        }
    }
2) In-band signal
    sequence_number
    payload_type
    if (fec_scheme = 001) or (fec_scheme = 010) {
        fec_block_boundary_info
    }
    if (fec_scheme = 011) or (fec_scheme = 100) or
    (fec_scheme = 101) {
        if (payload_type = 00) or (payload_type = 10) {
            fec1_block_boundary_info
        }
        if (payload_type = 01) {
            fec2_block_boundary_info
        }
    }
    if ((paylaod_type = 01) or (paylaod_type = 01)) and
    (ibg_mode = 10) or (ibg_mode = 11)) {
        parity_data_for_ibg
    }
```

In FIG. 5, the FEC block generator 520 uses the source payloads and control information as inputs in order to output the repair payload, the source FEC payload ID, and the repair FEC payload ID. In order to acquire the repair payload, the FEC block generator 520 groups the source payloads into a source symbol block and processes the source symbol block so as to generate the information block including the information payload having a same length for the FEC encoder 530. The source FEC payload ID and the repair FEC payload ID are the identity information needed for identifying different payloads. The source FEC payload ID may be omitted when the source FEC payload identity information exists on the layer including the MMT FEC-FRAME 500 or the next higher layer. The source FEC payload ID and the repair FEC payload ID are used as the input to the FEC encoder 530 according to the implementation of the FEC encoder 530.

Figure 7:
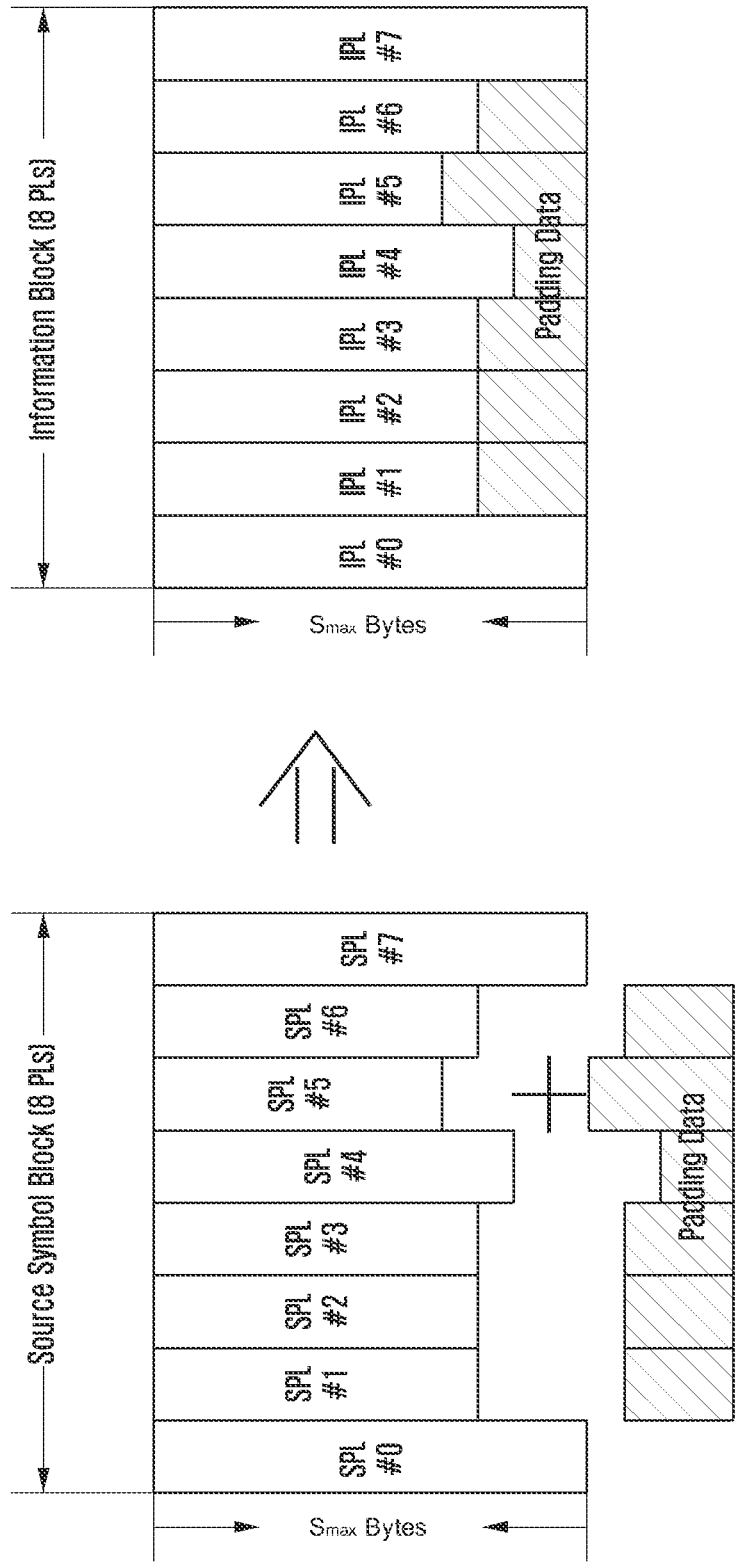
FIG. 7 is diagram illustrating a principle of generating an information block in a FEC block generator of an apparatus according to an exemplary embodiment of the present invention

FIG. 7 is diagram illustrating a principle of generating an information block in an FEC block generator of an apparatus according to an exemplary embodiment of the present invention.

Referring to FIG. 7, if 8 source payloads having variable packet size, i.e. SPL #0 to SPL #7 are input, then the FEC block generator adds padding data to make the payload size equal to a maximum payload size, e.g. S_max, wherein a size of a payload may also be referred to as a length of a payload, and generates an information block including 8 information payloads, i.e. IPL#0 to IPL#7. Although FIG. 7 is directed to a case where the maximum length S_max of the source payload is equal to the length of the information payload, then the information payload length may be set to a value less than S_max according to a system complexity and a memory requirement.

Figure 8:
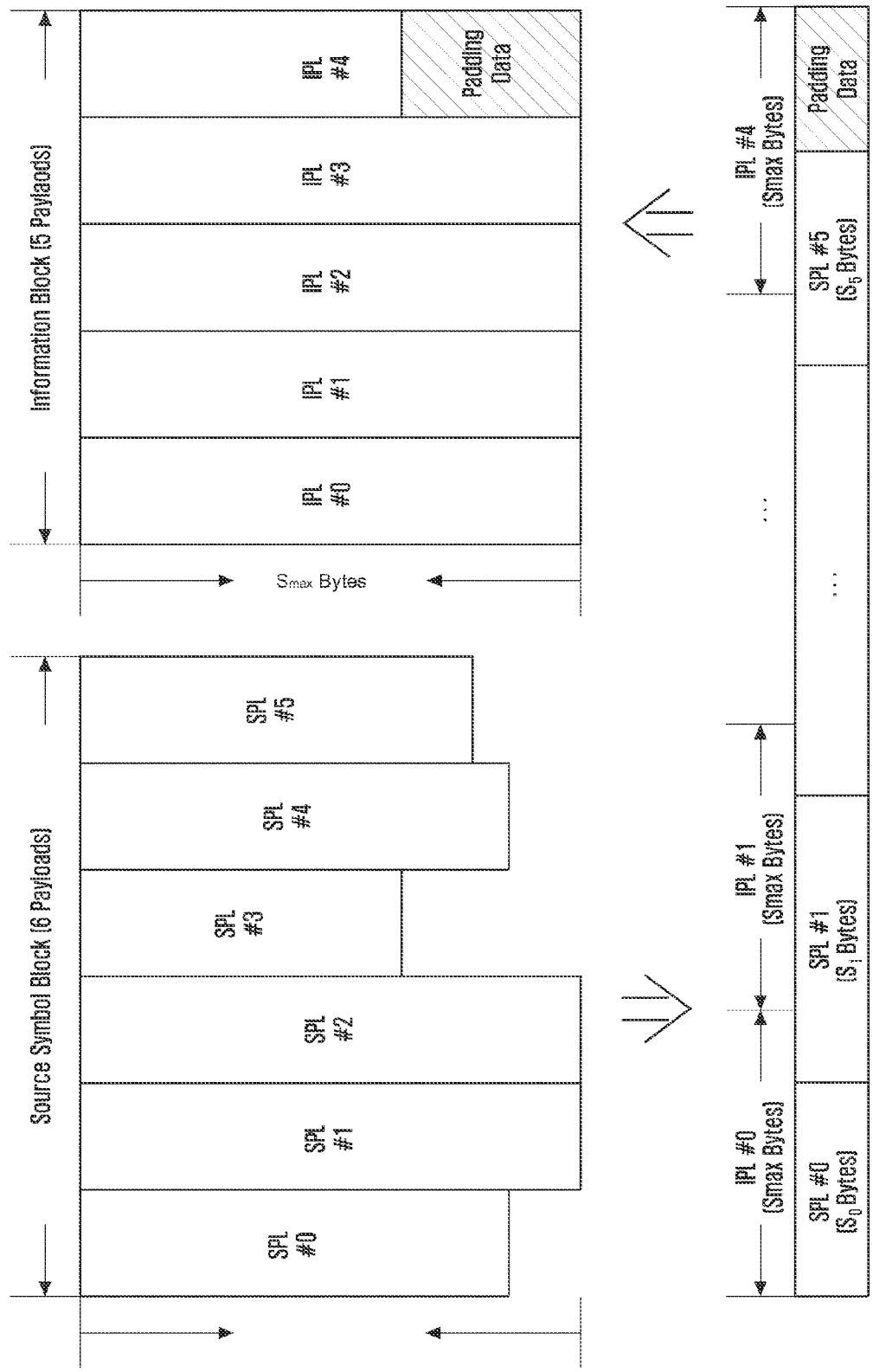
FIG. 8 is a diagram illustrating a principle of generating an information block in a FEC block generator of an apparatus according to an exemplary embodiment of the present invention.

FIG. 8 is a diagram illustrating a principle of generating an information block in an FEC block generator of an apparatus according to an exemplary embodiment of the present invention.

Referring to FIG. 8, if 6 source payloads, SPL #0 to SPL #5, having variable packet sizes are input, then the FEC block generator arranges the source payloads SPL #0 to SPL #5 in series and divides the a set of the payloads into 5 information payloads, IPL#0 to IPL#4, in units of a maximum length S_max of an information payload. At this time, it is noted that the last information payload includes the padding data. In the exemplary embodiment of FIG. 8, a boundary of the source symbol blocks is mismatched with respect to a boundary of the information payload, and, thus, there is a need for providing the receiver with the information needed for extracting the source payloads from the information block, such information including lengths of the individual source payloads, by including the information in the information block or through extra signaling to the receiver. Although FIG. 8 is directed to a case where a maximum length S_max of the source payload is equal to the length of the information payload, the information payload length may be set to a value less than S_max according to a system complexity and a memory requirement.

In the case of using the two-stage method, the information block is generated as follows. In the present case, the source symbol block consists of M sub-blocks. The first information code sub-block is generated with the source payload of the first sub-block from among the M sub-blocks and is transferred to the FEC encoder 530. The FEC encoder 530 generates the repair payload using the information code sub-block and transfers the repair payload to the FEC block generator 520. The process applied to the first information code sub-block is sequentially repeated with the second to $M^{th}$ information code sub-blocks. After generating the repair payloads with all sub-blocks, the first to $M^{th}$ information code sub-blocks are combined so as to generate an information block for the FEC encoder 530. The FEC encoder 530 generates the repair payloads with the information block and transfers the repair payloads to the FEC block generator 520. Afterward, all the repair payloads generated from M information code sub-blocks and the repair payloads generated from the information block are transferred to the packet generator 540.

Referring to FIG. 5, the FEC encoder 530 calculates the repair symbols using the FEC encoding algorithm determined with the input of the information block and generates the repair payload including the repair symbols in the form of a repair symbol block. In an exemplary embodiment, the FEC encoding algorithm calculates the value of a fixed number of repair symbols with the input of the fixed number of information code symbols. In this case, the FEC encoder 530 uses no extra control information. In another exemplary embodiment, the FEC encoding algorithm may request for the FEC encoding information, such as the number of information symbols, the number of repair symbols, and a relationship between the information code symbol and the repair symbol. Although the FEC encoding information is provided from the FEC block generator 520 to the FEC encoder 530 as a part of the FEC transmission information, the present invention is not limited thereto, and other function blocks of the MMT FECFRAME 500 may determine the FEC transmission information for use in their respective operations from the system view point.

Figure 9:
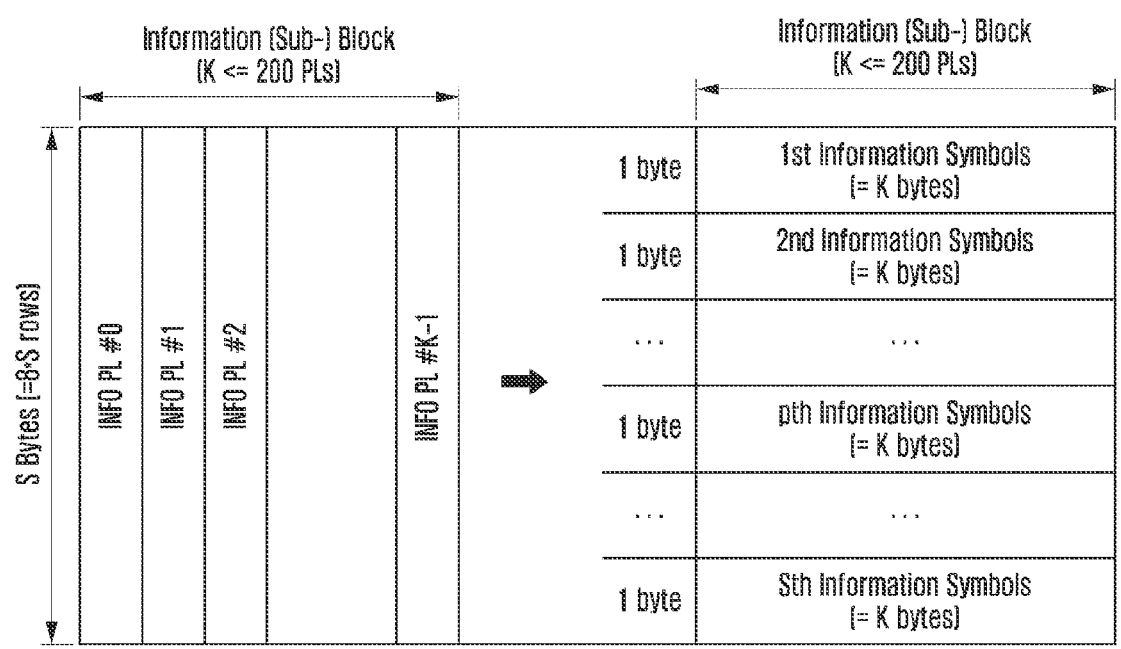
FIG. 9 is a diagram illustrating a principle of information symbol mapping in an information block in using a Reed-Solomon (RS) code in a method according to an exemplary embodiment of the present invention.

FIG. 9 is a diagram illustrating a principle of information symbol mapping in an information block in using an RS code in a method according to an exemplary embodiment of the present invention.

Figure 10:
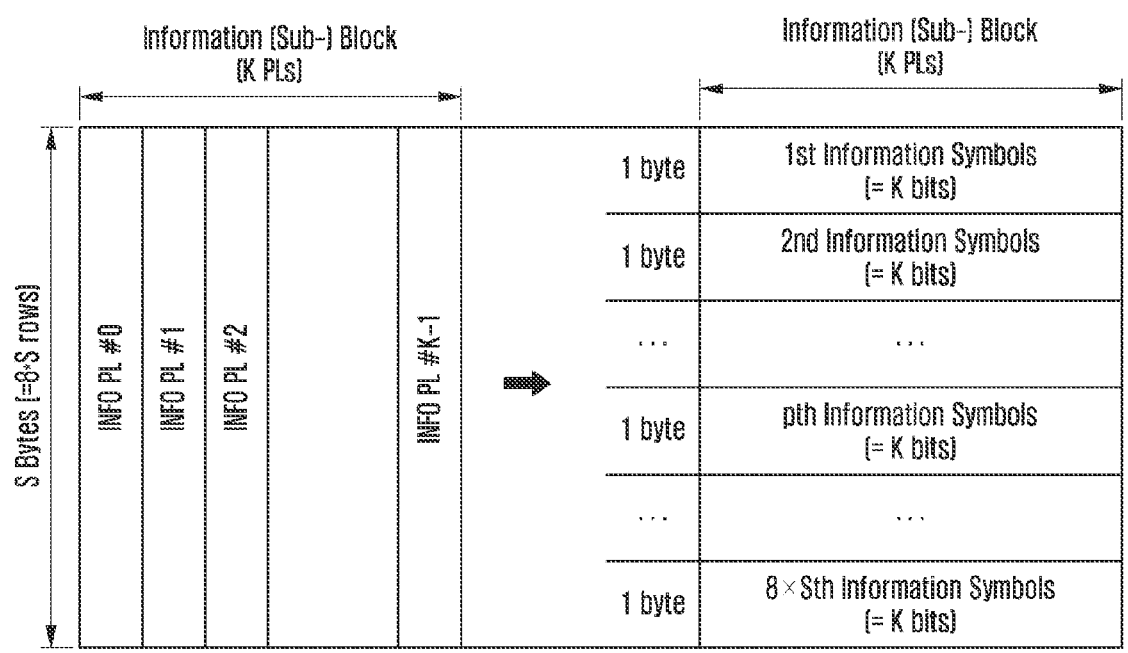
FIG. 10 is a diagram illustrating a principle of information symbol mapping in an information block in using a Low Density Parity Check (LDPC) code in a method according to an exemplary embodiment of the present invention.

FIG. 10 is a diagram illustrating a principle of information symbol mapping in an information block in using an LDPC.

Referring to FIGS. 9 and 10, in a case where K, which in number of information bits, is less than 200 in the information block, then the FEC encoder 530 maps the source symbol block to the information block in order to generate the information symbol for RS coding as shown in FIG. 9 or in order to generate the information symbol for LDPC coding as shown in FIG. 10.

Figure 11:
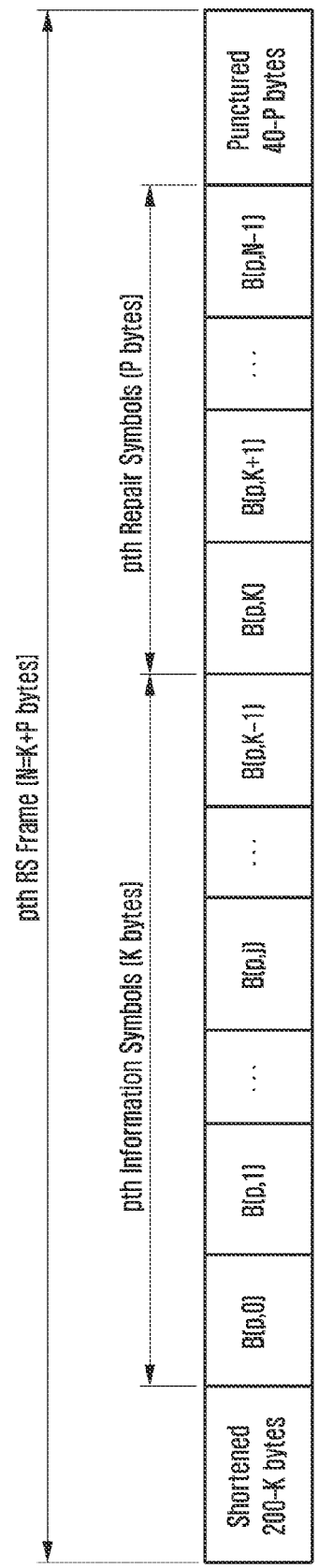
FIG. 11 is a diagram illustrating an RS frame format for use in a method according to an exemplary embodiment of the present invention.

FIG. 11 is a diagram illustrating an RS frame format for use in a method according to an exemplary embodiment of the present invention.

Figure 12:
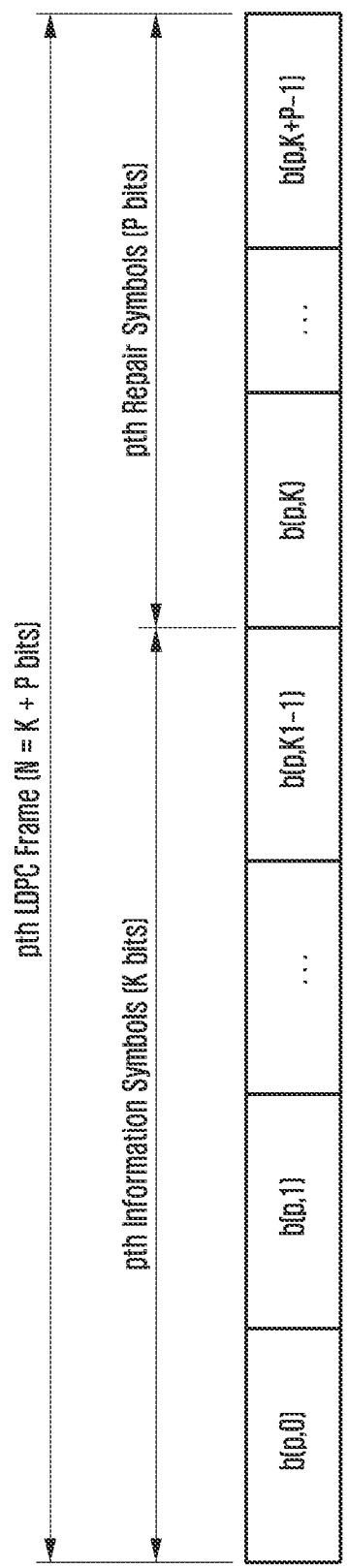
FIG. 12 is a diagram illustrating an LDPC frame format for use in a method according to an exemplary embodiment of the present invention.

FIG. 12 is a diagram illustrating an LDPC frame format for use in a method according to an exemplary embodiment of the present invention.

Referring to FIGS. 11 and 12, individual information symbols are encoded with any of RS and LDPC codes in order to generate repair symbols as shown in FIGS. 11 and 12. Although not depicted in FIG. 12, shortening and puncturing may be applied so as to generate the repair symbols with various K and P, wherein P is a number of parity bits. However, the present invention is not limited thereto, and only one of the shortening and puncturing may be applied.

Figure 13:
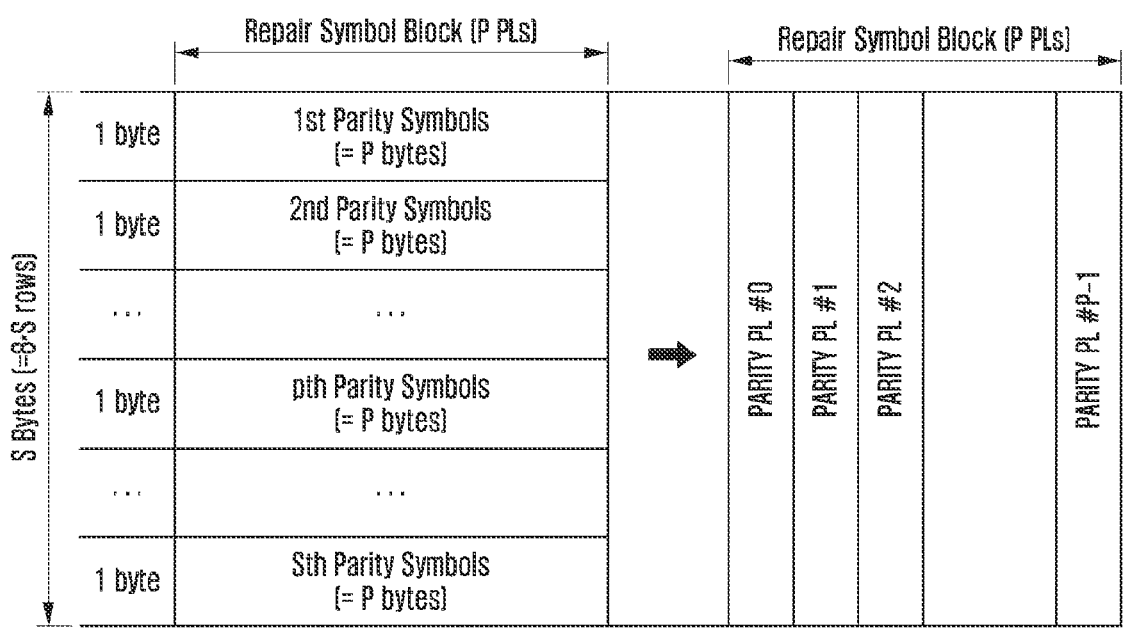
FIG. 13 is a diagram illustrating a principle of parity symbol mapping in a repair symbol block in using an RS code in a method according to an exemplary embodiment of the present invention.

FIG. 13 is a diagram illustrating a principle of parity symbol mapping in a repair symbol block in using an RS code in a method according to an exemplary embodiment of the present invention.

Figure 14:
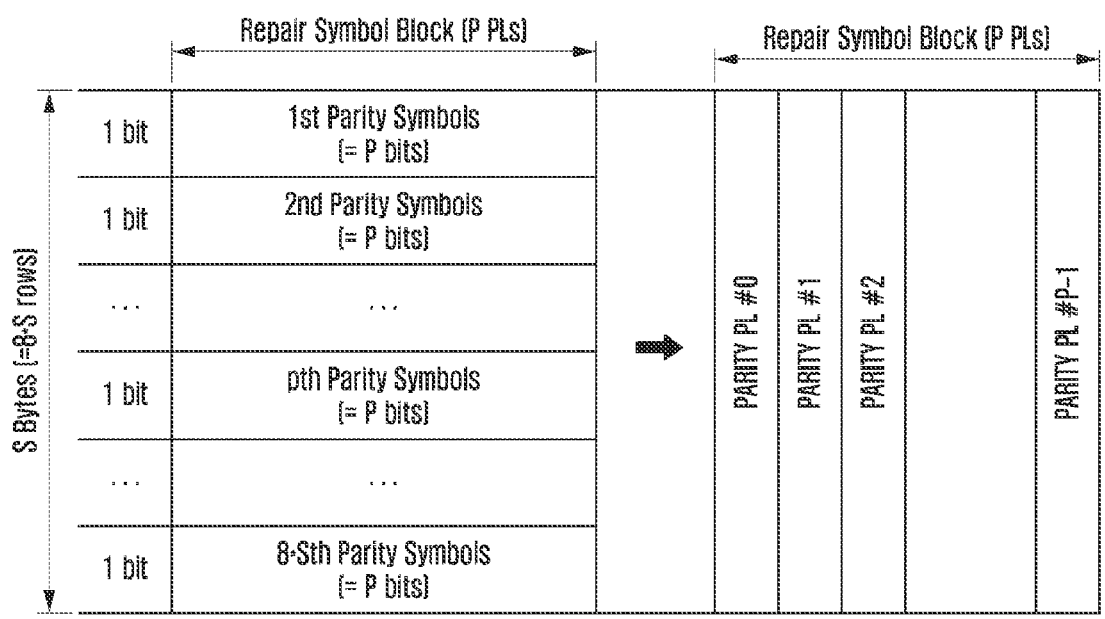
FIG. 14 is a diagram illustrating a principle of LDPC parity symbol mapping in a repair symbol block in using an LDPC code in a method according to an exemplary embodiment of the present invention.

FIG. 14 is a diagram illustrating a principle of LDPC parity symbol mapping in a repair symbol block in using an LDPC code in a method according to an exemplary embodiment of the present invention.

Referring to FIGS. 13 and 14, the RS repair symbol block as shown in FIG. 13 and the LDPC repair symbol block as shown in FIG. 14 can be generated from the repair symbols. Descriptions are made of the RS code and LDPC code specification hereinafter. A primitive polynomial of RS(N, K) code over a finite field $GF(2^8)$ is defined as $p(x)=x^8+x^4+x^3+x^2+1$. A symbol over $GF(2^8)$ may be expressed as $(\alpha^7, \alpha^6, \alpha^5, \alpha^4, \alpha^3, \alpha^2, \alpha, 1)$. Here, $\alpha$=00000010 (binary). Additionally, each RS Codeword (RSC) is RS (240,40) code over the finite field $GF(2^8)$ with information of 200 bytes and parity of 40 bytes that is expressed as a vector of RSC=(e0, e1, . . . , e199, p200, . . . , p239). The LDPC (K+P, K) code over the finite field GF(2) has a QC-LDPC structure with K information bits and P parity bits. Here, K=L×400, P=L×80, and L=1, 2, 4, 8, or 16. Particularly, the parity part of the LDPC has the form of approximately triangular matrix as shown in FIG. 15.

FIG. 15 is a diagram illustrating a structure of a matrix H for use in a method according to an exemplary embodiment of the present invention.

Referring to FIG. 15, the matrix H and a matrix P are illustrated. Although the description of the present exemplary embodiments has been directed to a case of using an RS code and an LDPC code, the present invention is not limited thereto, and any suitable and/or similar types of codes used as an FEC code, including Raptor, RaptorQ, XOR, may be applied. Referring to FIG. 5, the FEC packet generator 40 generates the FEC packet including the source payload or repair payload, the source FEC payload ID or the repair FEC payload ID, and the in-band signal, in the form of an FEC packet block.

A description is made of the FEC packet generation procedure according to an exemplary embodiment of the present invention hereinafter. The payload type of the packet header is configured so as to match with a corresponding payload. That is, the payload type of the packet for the source payload indicates the source payload type, such as audio, video, etc., and the payload type of the packet for repair payload indicates the repair payload. The sequence number is assigned to the FEC source packets sequentially, and separate sequence numbers are sequentially assigned to the FEC repair packets, the initial sequence number being configured to identify the repair block boundary in the corresponding FEC block, e.g. starting from the initial sequence number of the FEC source packet. By configuring the sequence numbers of the FEC source packets and FEC repair packets to be correlated in the FEC block, it is possible to indicate the FEC repair packet boundaries, or in other words, the repair block boundaries. The initial sequence number of the corresponding FEC block is contained in the header of each packet as FEC block boundary information. In a case of applying FEC selectively, the EC flag information may be contained in the header of each packet as well. In a case where the number of FEC source packets or the number of FEC repair packets of the FEC block is variable, then the information on the number of packets or the information on the number of FEC source packets and the number of FEC source packets or the number of FEC repair packets of the FEC block may be contained in the header of each packet.

Table 1 shows an exemplary packet header for use in the FEC packet generation method according to an exemplary embodiment of the present invention.

TABLE 1

Payload Type
Sequence Number
FEC Flag
FEC Block Boundary
Packet# for FEC Block(or Source symbol block)
Packet# for Source symbol block(or Repair Block)

In FIG. 5, the packet (de)multiplexer 550 demultiplexes the FEC packet block as an input into multiple packet streams or multiplexes multiple FEC packet blocks into a packet stream. The packet (de)multiplexer 550 is the function block interfacing with the protocol layer below the MMT FECFRAME 500 and may be omitted when a lower protocol layer performs the functions of the packet (de)multiplexer 550.

According to an exemplary embodiment of the present invention, the FEC configuration information and other encoding configuration information are signaled to the receiver such that the sender is capable of transmitting content to which FEC is applied selectively. According to an exemplary embodiment of the present invention, the FEC may be applied selectively according to a network condition and a QoS of the content. According to an exemplary embodiment of the present invention, an entirety or some of the FEC configuration information and other coding configuration information are transmitted periodically or through in-band signaling so as to provide newly joined receivers with the FEC configuration information in a state of providing a service such that the newly joined receivers are capable of FEC decoding in order to recover lost data, resulting in improvement of service quality to a user. As described above, the packet transmission/reception method and apparatus of the present exemplary embodiments is advantageous in providing the user with high quality multimedia service.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting media data, the method comprising:
generating a source block based on an information block, the source block including at least one source packet;
generating a parity block by a forward error correction (FEC) coding using at least one information block, the parity block including at least one parity packet;
identifying an FEC packet block including at least one source block and at least one parity block; and
transmitting the FEC packet,
wherein the at least one parity packet further comprises a parity packet header including boundary information corresponding to the source block.

2. The method of claim 1,
wherein the FEC packet further comprises a FEC packet header, and
wherein the FEC packet header further comprises a packet sequence number.

3. The method of claim 2,
wherein the source packet further comprises a source packet header, and
wherein the source packet header includes the initial sequence number of the source block and a value for indicating a boundary for the source block.

* * * * *